US008742919B2

(12) United States Patent
Choi (10) Patent No.: US 8,742,919 B2
(45) Date of Patent: Jun. 3, 2014

(54) SYSTEM FOR TRACKING CONTAINERS AND LOGISTICS USING A BIOMETRIC IDENTITY CARD AND A CSD

(76) Inventor: Unho Choi, Seoul (KR)

( * ) Notice: Subject to any disclaimer, the term of this patent is extended or adjusted under 35 U.S.C. 154(b) by 126 days.

(21) Appl. No.: 13/440,428

(22) Filed: Apr. 5, 2012

(65) Prior Publication Data

US 2012/0188104 A1    Jul. 26, 2012

Related U.S. Application Data

(63) Continuation of application No. PCT/KR2010/006700, filed on Sep. 30, 2010.

(30) Foreign Application Priority Data

Oct. 8, 2009   (KR) .................. 10-2009-0095872
Nov. 24, 2009  (KR) .................. 10-2009-0113762

(51) Int. Cl.
   *G08B 29/00*   (2006.01)

(52) U.S. Cl.
   USPC ............. 340/506; 340/426.19; 340/539.13; 340/541; 340/573.1; 340/989; 701/200; 701/207

(58) Field of Classification Search
   USPC ........... 340/539.13, 426.19, 573.1, 573.3, 340/995.22, 989, 5.52, 5.53, 5.6, 5.82, 506, 340/429.19, 541; 701/29, 30, 300, 301, 2, 701/115, 200, 207
   See application file for complete search history.

(56) References Cited

U.S. PATENT DOCUMENTS

| | | | |
|---|---|---|---|
| 6,889,135 B2 * | 5/2005 | Curatolo et al. ............ | 701/468 |
| 7,102,493 B1 * | 9/2006 | Coppinger et al. ......... | 340/426.19 |
| 7,218,227 B2 * | 5/2007 | Davis et al. ................ | 340/572.1 |
| 7,385,497 B2 * | 6/2008 | Golden ....................... | 340/521 |
| 7,936,271 B2 * | 5/2011 | Karr et al. .................. | 340/572.4 |
| 2004/0178880 A1 * | 9/2004 | Meyer et al. ............... | 340/5.22 |
| 2005/0046567 A1 | 3/2005 | Mortenson et al. | |
| 2006/0181413 A1 * | 8/2006 | Mostov ...................... | 340/539.22 |
| 2006/0190628 A1 | 8/2006 | Linton et al. | |
| 2008/0121690 A1 | 5/2008 | Carani et al. | |

FOREIGN PATENT DOCUMENTS

KR    100778623    11/2007

OTHER PUBLICATIONS

PCT International Search Report dated May 24, 2011 received in corresponding PCT Application No. PCT/KR10/06700, 6 pgs.

* cited by examiner

*Primary Examiner* — Hung T Nguyen
(74) *Attorney, Agent, or Firm* — Grossman Tucker Perreault & Pfleger, PLLC (57) ABSTRACT

A system for tracking containers and logistics using a biometric identity card and a CSD (Container Security Device). The system comprises: a container security device control unit which receives, in accordance with the result of an authentication, container biometric authentication card information from the container biometric identity card, and generates container status information including lock information obtained, and an open message obtained when the container is opened; a container tracking communication terminal unit, periodically generates current location information, and transmits the container status information and the current location information through a wireless communication system; and a container tracking server and the current location information, stores the received information, receives selected container identity information, extracts the container status information and the current location information corresponding to the container identity information, and displays the extracted information at container tracking center.

17 Claims, 4 Drawing Sheets

SYSTEM FOR TRACKING CONTAINERS AND LOGISTICS USING A BIOMETRIC IDENTITY CARD AND A CSD

CROSS-REFERENCE TO RELATED APPLICATIONS

This application is a continuation of PCT/KR2010/006700 filed Sep. 30, 2010, which claims priority to Korean Patent Application Nos. 10-2009-0095872 filed Oct. 8, 2009, and 10-2009-113762 filed Nov. 24, 2009, the entire contents of which are incorporated herein by reference.

TECHNICAL FIELD

The present disclosure relates to a system for tracking containers and logistics using a biometric card and a CSD (Container Security Device), and more particularly to a system for tracking containers and logistics using a biometric authentication card and a CSD, which provides the management environment which supports logistics safety management and logistics track by providing integrated support of the entrance control and cargo container/trailer management, etc.

BACKGROUND

The statements in this section merely provide background information related to the present disclosure and may not constitute prior art.

Generally, logistics indicates the flow of products from a producer to consumers, and includes a process of the transportation of manufactured products, unloading, storage, packing and a process of physical distribution including product distribution and manufacture or transportation intra. It takes more than one step of product distribution process until the product is produced and provided to consumers, and the manufacturer should process transportation means of his or her own for the product distribution process, or transport the products by requesting a logistic company.

Transportation companies or shippers should plan ahead against or handle problems such as car dispatching, cargo loss, and transportation delay. In a past manual system, the driver reports the transportation status with a mobile phone to the logistics manager. Recently, an automatic system is in operation such that the present location of the vehicle and the cargo carriage is periodically informed by connecting the system to a location tracking module (GPS), a mobile phone network, a wireless data network, or a satellite network. However, there is a drawback that the real-time location of the cargo or the vehicle cannot be promptly tracked since the system can not obtain various and accurate information and operate thereof.

DISCLOSURE

Technical Problem

Therefore, a preferred embodiment of the present invention provides a system and method for tracking containers and logistics utilizing an authorization device used a biometric authentication card and a container security device (CSD), which provides a management environment supporting logistics safety management and logistics track by providing integrated support of the entrance control and cargo container/trailer management.

SUMMARY

An aspect of the present disclosure provides a system for tracking containers and logistics utilizing an authorization device used a biometric and a container security device (CSD), the system comprises: a container security device control section for receiving a biometric authentication card information in accordance with an authentication executing result from the biometric authentication card for storing a biometric information, and creating a container status information including a locking information after performing a locking operation of a container and an opening message in case of being an opening status for the container; a container public key certificate tracking communication terminal section for receiving the container status information from the container security device control section, creating a present location information periodically and transmitting the container status information and the present location information; and a container tracking server for receiving and storing the container status information and the present location information, and receiving a selected container identification information and extracting and displaying the container status information corresponding to the container identification information and the present location information.

ADVANTAGEOUS EFFECTS

According to the present disclosure as described above, a system for tracking containers and logistics can provide a management environment supporting logistics safety management and logistics track by providing integrated support of the entrance control and cargo container/trailer management.

DETAILED DESCRIPTION

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Figure 1:
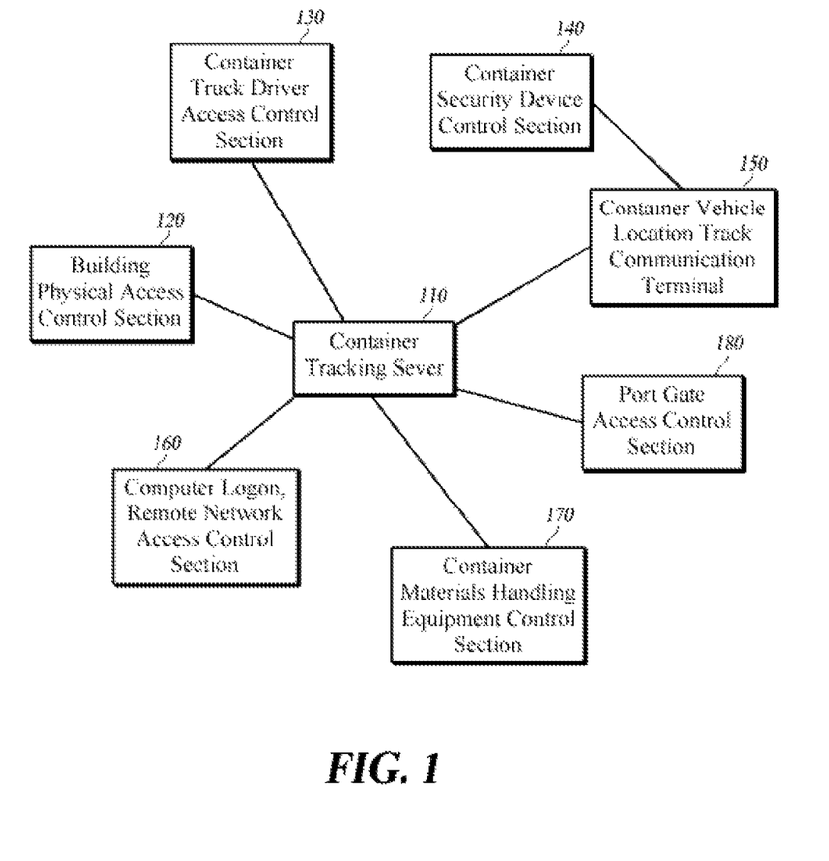
FIG. 1 is a block diagram schematically showing a container and logistics tracking system according to a preferred embodiment of the present invention.

FIG. 1 is a block diagram schematically showing a container and logistics tracking system according to a preferred embodiment of the present invention.

As illustrated in FIG. 1, the tracking system for containers and logistics in accordance with the preferred embodiment of the present invention comprises a container tracking server 110, a container security device (CSD) 140, and a container vehicle location track communication terminal 150. The system may further comprise a building physical access control section 120, a container truck driver access control section 130, a computer logon, remote network access control section, computer logon, remote network access control section 160, an container materials handling equipment control section 170, and a port gate access control section 180.

The container security device (CSD) 140 receives a biometric authentication card information upon the authorization result from the biometric authentication card which stores a biometric authorization information, and generates a lock information after performing a locking action of the container and a container status information including an opening message when the container is opened.

The container vehicle location track communication terminal 150 receives a container status information from the container security device 140, generates a present location information periodically, and transmits the container status information and the present location information by a wireless network to the logistics track server 110. The container vehicle location track communication terminal 150 preferably connects with the logistics track server 110 and the global positioning system (GPS).

The logistics track server 110 receives and stores the container status information and the present location information from the container vehicle location track communication terminal 150, extracts the container status information and the present location information corresponding to selected container identification information, which is selected to confirm the track status using a user interface, and displays the extracted information on a display device. The container identification information is an information identifying the container, such as container number, cargo content, consignor, report records.

Figure 2:
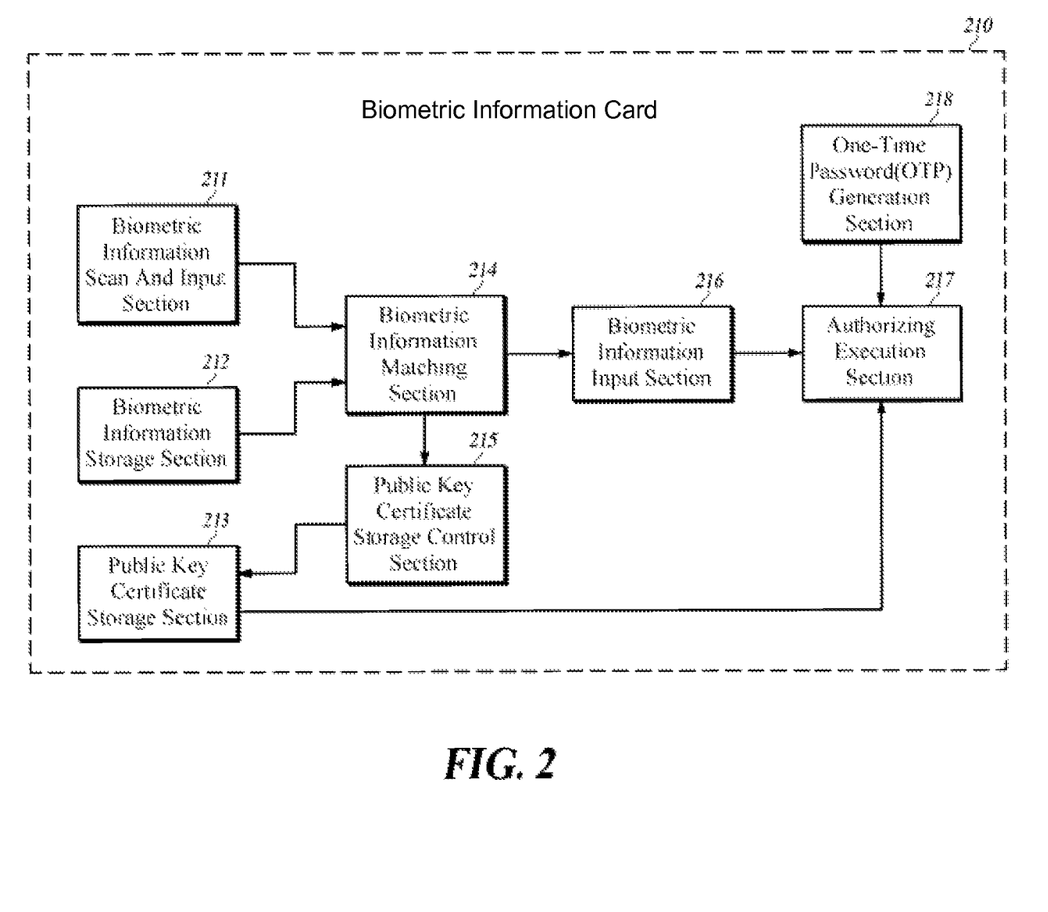
FIG. 2 is a block diagram showing a biometric authentication card such as an authorization device which can be used by a biometric identity card for a building entrance physical access control and log on export or import logistics computer systems, a biometric authentication card, a container driver biometric authentication card, a computer user authorization biometric authentication card, a unloading worker biometric authentication card in the container and logistics tracking system according to a preferred embodiment of the present invention.

FIG. 2 is a block diagram showing a biometric card such as an authorization device which can be used by a biometric card for a building entrance physical access control and log in export or import logistics computer system, a biometric authentication card, a driver biometric authentication card, a computer user biometric authentication card, an unloading worker biometric authentication card in the container and logistics tracking system according to a preferred embodiment of the present invention.

As illustrated in FIG. 2, the biometric authentication card 210 comprises a biometric information scan and input section 211, a biometric information storage section 212, a biometric information matching section 214, a signal transmission section 216, and an authorization execution section 217. The biometric authentication card 210 may further comprise a public key certificate storage section 213, a public key certificate storage control section 215, and an one-time password (OTP) generation section 217.

The biometric information scan and input section 211 is inputted with the biometric information of the biometric authentication card user. Here, the biometric information scan and input section 211 may be implemented as a fingerprint scan sensor, an iris scan sensor, a voice recognition sensor, a blood vessel recognition sensor, a palm scan sensor, or the like.

The biometric information storage section 212 stores the biometric information of the subscriber registered by the issuance server (not illustrated) of the biometric card 210. In this case, the biometric information storage section 212 stores the biometric information according to the kind of sensor of the biometric information scan and input section 211. That is, when the biometric information scan and input section 211 is implemented as the fingerprint scan sensor, the biometric information storage section 212 stores the fingerprint pattern recognition information of the registered subscriber as the biometric information, and stores the iris pattern recognition information of the registered subscriber as the biometric information when the biometric information scan and input section 211 is implemented as the iris scan sensor. In here, the issuance server of the biometric card 210 is a server of a certificate authority, and the biometric information of the biometric card 210 is preferably stored in the biometric information storage section 212 of the biometric authentication card, to register and store the same biometric information, and to employ the techniques codifying the biometric authentication card 210 so that unauthorized modification, deletion, and addition, etc on the biometric information, stored in the biometric information storage section 212 of the biometric card 210, are not possible.

The biometric information storage section 212 can store a plurality of biometric information of the registered subscriber. For example, when storing the fingerprint pattern recognition information of the registered subscriber as the biometric information, the fingerprint pattern recognition information of each finger can be stored, and the iris pattern recognition information of both eyes can be stored when storing the iris pattern recognition information of the registered subscriber as the biometric information.

The biometric information matching section 214 checks whether the biometric information, which is inputted by the biometric information scan and input section 211, matches the biometric information stored in the biometric information storage section 212. In other words, it is checked whether the biometric information of the user, which is authorized by the biometric card 210, matches the biometric information of the user registered by the public key certificates issuance server.

The signal transmission section 216 transmits the tunneling start signal to install a target terminal communication tunnel when it is determined that the biometric information inputted by the biometric information scan and input section 211 matches the biometric information stored in the biometric information storage section 212. Herein, the target terminal can be a container which directly connects with the biometric authentication card 210 through a wired or a wireless network, or can be the container vehicle location track communication terminal section 150 which transmits and receives the status information of the container through the wired or wireless network, or can be the container tracking server 110 that transmits or receives the container status information and the present location information to/from the vehicle location tracking communication terminal 150. If the target terminal is the container vehicle location track communication terminal 150, connected through the wire network or the wireless network, or the logistics track server 110, then the location of the target terminal on the network can be set as a URL (Uniform Resource Locator), and communication tunnel can be set up by establishing a VPN (Virtual Private Network) with the determined URL.

When a communication tunnel is established up to the target terminal by the signal transmission section 216, the authorization execution section 217 transmits the authorization execution information that the biometric authentication card 210 user is authenticated as an authorized user through the biometric information to the relevant target terminal. In this case, the authorization executing information transmitting to the target terminal comprises authorization visual information, an identification information given to the biometric authentication card 210, and user information.

In the meantime, the issuance server of the biometric authentication card 210 can issue, including the biometric information of the registered subscriber, the public key certificates matching the biometric information. That is, when the user subscribes to a relevant biometric identification card issuance organization to obtain the biometric identification card 210 and registers personal biometric information, then the issuance server of the biometric identification card 210 inserts the registered biometric information into the public key certificate after encoding it, and issues the relevant public key certificate to the user. The public key certificates is a sort of an electronic guarantee with which a business partner can be trusted when doing business on the web, issued from a certain certificate authority, and comprises user name of the public key certificate, validity, a public key to confirm digital signature of the user, and a digital signature of the certificate authority who certifies it is authentic. The biometric information, as it is described, preferably comprises at least one of fingerprint pattern recognition information, vascular pattern recognition information, voice pattern recognition information, iris pattern recognition information, or palm pattern recognition information of the registered user.

The public key certificates storage section 213 stores the public key certificate which is issued by the issuance server of the biometric identification card 210. Then, it is desirable for the public key certificate storage section 213 to be implemented so that only the organization issuing the biometric identification card 210 may store the public key certificate in the public key certificate storage section 213. But, in certain circumstances, the user may download the certain public key certificate by accessing the issuance server of the biometric identification card 210 through the network, and store the public key certificate in the public key certificate storage section 213, or take a copy of the certificate from a personal computer and store the public key certificate in the public key certificate storage section 213.

Before the public key certificate storage control section 215 stores the public key certificate in the public key certificate storage section 213, it can be determined whether the information matching the biometric information of the user is included in the relevant public key certificate, only if the biometric information of the user inputted by the biometric information scan and input section 211 is matched with the biometric information stored in the biometric information storage section 212. The public key certificate storage control section 215 is implemented to store the public key certificate in the public key certificate storage section 213, only when it is determined that the relevant public key certificate includes the information matching the biometric information of the user. By doing so, the public key certificate storage control section 215 can primarily allow only the authorized user of the biometric card 210 to store the public key certificate in the public key certificate storage section 213 and secondly the public key certificate stored in the public key certificate storage section 213 can be implemented to be limited only to the public key certificate including the information matching the biometric information of the authorized user. Such public key certificate storing process is, however, to intensify the authorization process with the biometric card 210. In some case, therefore, it can be implemented to store the relevant public key certificate even though it has no information matching the biometric information of the user.

In the above-mentioned case, the authorization execution section 215 transmits not only the authorization process based on the biometric information of the user, but also the authorization information based on the public key certificate matching the user whose biometric information is confirmed based on the public key certificate stored in the public key certificate storage section 213, and can harden the authorization process by executing the secondary authorization process on the user of the biometric card 210.

When a plurality of biometric information on registered subscriber are stored in the biometric information storage section 212, the signal transmission section 216 may be implemented to transmit the tunneling start signal to a different target terminal in accordance with the biometric information matching the biometric information inputted through the biometric information scan and input section 211. For example, when the fingerprint pattern recognition information on a plurality of the fingers of the subscriber registered in the biometric information storage section 212 is stored as the biometric information, then the communication tunnel is established as a safety management server such as a police server on one of any fingerprint pattern recognition information and the emergency signal is transmitted to the server, it is implemented to file a report with the fingerprint pattern recognition information when it is a case for the user to execute the authorization process using the biometric card 210 forcefully by the threat of a stranger.

The one-time password (OTP) generation section 218 generates the one-time password (OTP) in a way determined by the issuance organization of the biometric identification card 210. In this case, the one-time password (OTP) generated by the one-time password (OTP) generation section 218 is displayed so that the user of the biometric identification card 210 can see, and the authorization execution section 215 can be implemented to transmit the authorization information to the target terminal after passing through another authorization process on the user of the biometric identification card 210 with the one-time password (OTP) input by the user. Alternatively, the one-time password (OTP) generated by the one-time password (OTP) generation section 218 cannot be viewed by the user of the smart card 210, and, the authorization execution section 215 may combine the one-time password (OTP) generated by the one-time password (OTP) generation section 218 with the authorization information and transmits it to the target terminal, so that the relevant target terminal side can confirm the user authorization based on the one-time password (OTP), and can be implemented to thirdly authorize that the relevant biometric card 210 was issued by the authorized organization.

Figure 3:
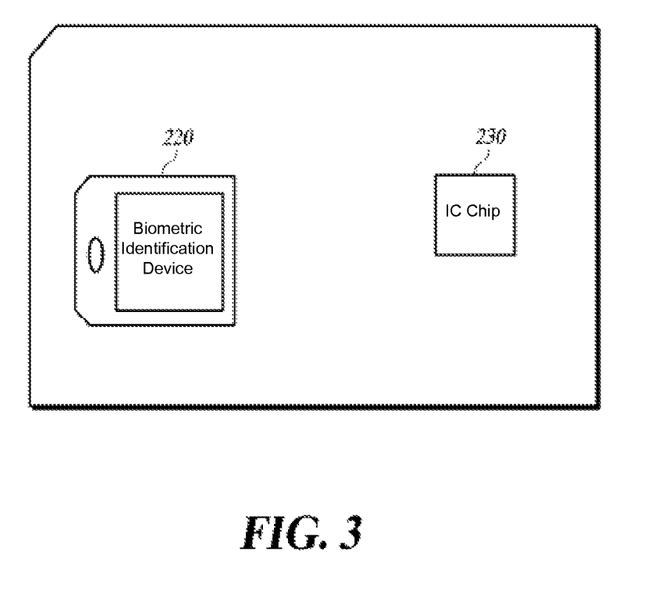
FIG. 3 is a view illustrating a biometric authentication card in the container and logistics tracking system according to a preferred embodiment of the present invention.

The biometric identification card 210 is implemented as the form of smart card, and can comprise the biometric identification device 220 and IC Chip 230, which identifies the fingerprint as illustrated in FIG. 3. The location of the fingerprint within the biometric identification card 210 can be the biometric identification device 220 or IC chip 230, the present invention is not limited to it.

The biometric identification card 210, storing the authorization information including the biometric information in accordance with the preferred embodiment of the present invention, is described as using fingerprint pattern recognition information as the biometric information, but vascular pattern recognition information, voice pattern recognition information, and iris pattern recognition information etc. can be used as the biometric information according to the embodiment.

The biometric identification card 210 stores the fingerprint pattern recognition information as the biometric identification information, and generates the biometric identification card information indicating that the authorization execution is accomplished when the stored identification information and the biometric information, which was identified from the biometric identification device 220, are matched.

The containers and logistics tracking system in accordance with the preferred embodiment of the present invention may further comprise the building physical access control section 120.

The building physical access control section 120 receives building entrance control and log in export or import logistics system biometric card information generated when the authorization of the building entrance control and export or import logistics system biometric card is accomplished used as the user authorization device using the biometric, and transmits the facility access control information, which includes the building entrance control and export or import logistics system biometric card information, wirelessly to the container tracking server 110 through wireless communication. Then, the logistics track server 110 uses the fixed user interface to select the container identification information which needs to be checked on the tracking condition, and receives the selected container identification information, then extracts and displays the container status information, the present location information, and the facility access control information corresponding to the selected container identification information.

The containers and logistics tracking system in accordance with the preferred embodiment of the present invention may further comprise the container truck driver access control section 130.

The container truck driver access control section 120 receives the driver biometric card information generated when the authorization execution from the driver biometric card storing the biometric authorization information is accomplished, and transmits the truck access information including the driver biometric card information to the container vehicle location track communication terminal 150, then, the container vehicle location track communication terminal 150 transmits the received truck access information to the logistics track server 110 through wireless communication. Then, the container tracking server 110 uses the fixed user interface to select the container identification information which needs to be checked on the tracking condition, and receives the selected container identification information, then extracts and displays the container status information, the present location information, and the truck access control information corresponding to the selected container identification information.

Meanwhile, the container security device control section 140 generates the container status information including whether the container is opened or closed.

The container vehicle location track communication terminal section 150 can receive the container status information including container opening/closing which has cargo, inside temperature and humidity from the container security device control section 140, and can transmit the status information in real time to the logistics track server 110 using a wireless communication network like CDMA (Code Division Multiple Access).

The container vehicle location track communication terminal section 150 is installed in the truck, and transmits to the logistics track server 110 the transportation vehicle information such as vehicle location information, service record information, vehicle parking/stop information based on GPS (Global Positioning System) in real time, by using both the wireless communication network such as CDMA (Code Division Multiple Access), GSM (Global System for Mobile Communication), and the terminal for transmitting a plurality of information in a bundle or by using simultaneously compatible terminals.

The above-mentioned communication terminal section 150 may comprise at least one among a mobile communication terminal, a mobile phone, and a communication equipment within a vehicle etc, and may be implemented as one of the user authorization device by combining the biometric identification card 210 and the communication terminal 150, and it is not limited only to that, but also can be implemented as the form of combination of the mobile phone and the biometric identification card.

Meanwhile, data exchange of the container vehicle location track communication terminal 150 and the container security device control section 140 can be performed by the wireless communication manner.

The containers and logistics tracking system in accordance with an embodiment of the present invention may further comprise the port gate access control section 180.

The port gate access control section 180 receives the driver biometric card information generated when the authorization from the driver biometric card storing the biometric authorization information is complete, detects the gate access information including the driver biometric card information and container information from the container, and transmits the gate access information and the container information to the container tracking server 110. By attaching RFID tag on the container and reading the attached RFID tag, the port gate access control section 180 can detect the container information. Then, the container tracking server 110 uses the fixed user interface to select the container identification information which needs to be checked on the tracking condition, and receives the selected container identification information, then extracts and displays the container status information, the present location information, and the gate access control information corresponding to the selected container identification information.

The containers and logistics tracking system according to the preferred embodiment of the present invention may further comprise the container materials handling equipment control section 170.

The container materials handling equipment control section 170 receives a unloading worker biometric card information generated when the authorization execution from the unloading worker biometric card storing the biometric authorization information is accomplished, and transmits the unloading equipment access information including the unloading worker biometric card information to the container tracking server 110. Then, the container tracking server 110 uses the fixed user interface to select the container identification information which needs to be checked on the tracking condition, and receives the selected container identification information, then extracts and displays the container status information, the present location information, and the unloading equipment access control information corresponding to the selected container identification information. Here, crane information used in loading or unloading and container vanning user or container extraction user information can be included in the unloading equipment access information.

The containers and logistics tracking system according to the preferred embodiment of the present invention may further comprise the computer logon, remote network access control section, computer logon, remote network access control section 160.

The computer logon, remote network access control section, computer logon, remote network access control section 160 receives a computer user authorization device information generated when the authorization execution from the computer user authorization device storing the biometric information is accomplished, and transmits the computer access control information including the computer user authorization device information to the container tracking server 110. Then, the logistics track server 110 uses the fixed user interface to select the container identification information which needs to be checked on the track condition, and receives the selected container identification information, then extracts and displays the container status information, the present location information, and the computer access control information corresponding to the selected container identification information.

Here, the computer user authorization device can be implemented as the biometric card, a USB security token, or a dongle, etc, but not limited to, and can be also implemented as one of the user authorization device by combining the smart card with the terminal.

As showed in FIG. 2, the biometric card 210 can further comprise a public key certificate storage control section 215 and an one-time password (OTP) generation section 218, besides a biometric information scan and input section 211 and a biometric information storage section 212.

In this case, the service authentication can be executed by combining at least one of authorization result on the biometric information of the user inputted through the biometric information scan and input section 211, and a public key managed in the public key certificate storage section 213, and/or public/private public key certificate created as a secret key base structure, and the one-time password (OTP) managed in the one-time password (OTP) generation section 218.

The biometric authentication card i card 210, whether combining the biometric information with the public key certificate, or the biometric information with the one-time password (OTP), or the biometric information with the public key certificate and the one-time password (OTP), can execute the service authentication including user authorization. In this case, for example, authentication through the public key certificate and through the one-time password (OTP) can be executed after the user authorization with the biometric information.

In this case, with the one-time password (OTP) generation section 218 equipped in the biometric card 210, the one-time password (OTP) can be generated by the user pressing the predetermined button (not illustrated) and can be indicated.

As mentioned above, the computer user authorization device in the preferred embodiment can be implemented as the biometric card comprising IC chip, or as USB (Universal Serial Bus) security token having USB interface, etc. And the biometric device comprised in the biometric card, yet identifying the fingerprint pattern recognition information was given as an example in the preferred embodiment, can identify at least one of fingerprint pattern recognition information, vascular pattern recognition information, voice pattern recognition information, and iris pattern recognition information of the certain user as the biometric information according to the preferred embodiment.

The biometric device 220 comprised in the biometric authentication card 210, in accordance with execution result of the service authentication from a service authentication section 314, can further comprise a program module drive control section (not illustrated) controlling one of a program module drive of the computer.

Figure 4:
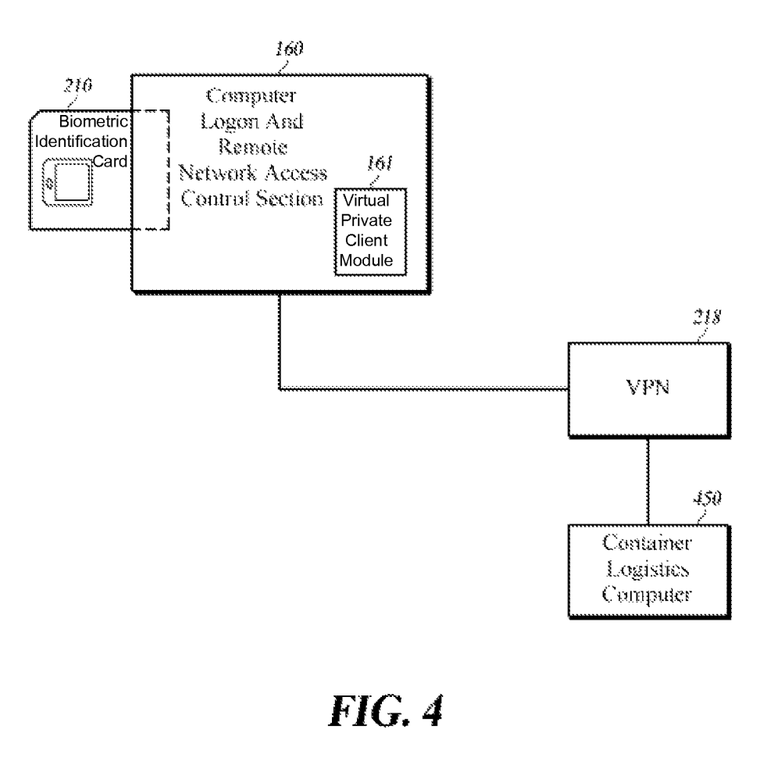
FIG. 4 is a view illustrating the biometric authentication card access relation between a computer logon, remote network access control section, computer logon, remote network access control section and a container and logistic computer which will be connected by a user in the container and logistics tracking system using VPN according to a preferred embodiment of the present invention.

FIG. 4 is a view illustrating the access relation between a computer logon, remote network access control section, computer logon, remote network access control section 160 and a container logistic computer 450 which will be connected to the computer logon, remote network access control section, computer logon, remote network access control section 160.

As illustrated in FIG. 4, the computer logon, remote network access control section, computer logon, remote network access control section 160 executes a user authorization process after confirming the computer authorization information, and is connected to a VPN (Virtual Private Network) according to the execution result of the user authorization process, and executes the service authentication by combining more than one between public key certificate generated as the public key base structure and the one-time password (OTP). In this case, the private information can be included in the authorization information transmitting to the target terminal to prove the action of the user later on. Such private information is preferably implemented, in an electronic way, as a form of bar code or user electronic signature, etc so that the user authorization and user operation time is possible. Such bar code and electronic signature of the user are preferably implemented to be printed. Furthermore, the transmission time information of the authorization information can be included in the authorization information transmitting to the target terminal. The authentication action utilizing the biometric card 210 can increase credibility on the mutual contract by printing receipt and statement as a form of user's signature.

The computer logon, remote network access control section 160 drives a virtual private client module 161 in accordance with an execution result of the user authorization process with the biometric card 210.

The virtual private network tunnel can be formed and connected to the container logistics computer 450, after executing service authentication by driving the virtual private network client module 161 and combining with more than one between the public key certificate generated as the public key base structure and the one-time password (OTP).

As illustrated on FIG. 4, after the biometric card 210 storing the already-registered fingerprint pattern recognition information is installed in the computer logon, remote network access control section 160 (For example, terminal of personal computer, KIOSK, CD/ATM (Cash Dispenser/Automatic Teller Machine), and mobile phone) through the external/embedded card reader, and the fingerprint of the user, who is about to use the computer logon, remote network access control section 160 through the biometric device 220 of the biometric card 210, is identified, then the biometric card 210 compares the fingerprint pattern recognition information which is already registered and stored with the fingerprint identified by the biometric device 220, and executes the user authorization process for the first time by authenticating the fingerprint pattern recognition information which is identified by the biometric device 220 in accordance with the comparing result, and can execute the user authorization by using the public key certificate for the second time. The biometric card 210, used as the computer user authorization device when the computer logon, remote network access control section, computer logon, remote network access control section controls the access, can additionally store the public key certificate in the fixed place with the biometric card 210 besides the fingerprint pattern recognition information.

For example, as a result of comparing 2 fingerprint pattern recognition information (That is, one among several fingerprint pattern recognition information and a currently identified fingerprint pattern recognition information), the way of approving the user authorization considering the relevant user as the approved user when the 2 fingerprint pattern recognition information match each other, and of not approving the user authorization considering the relevant user as not approved user when the 2 fingerprint pattern recognition information do not match each other, can be used.

According to the user authorization process execution result of this biometric card 210, the virtual private network client module 161 is driven in the computer logon, remote network access control section, computer logon, remote network access control section 160. In this case, personal information and driving module (program) of the rack of the biometric card 210 can be stored.

The driving module is a module which sends signal to the computer logon, remote network access control section, computer logon, remote network access control section 160, and dives the virtual private network client module 161.

Likewise, when the biometric card 210 additionally stores the issued public key certificate, the biometric card 210 can execute not only the user authorization process using the fingerprint pattern recognition information, but also the user authorization using the stored public key certificate. That is, the biometric card 210 can execute the user authorization process authenticating after merging the fingerprint pattern recognition information with the public key certificate.

For example, the user who is about to use the computer logon, remote network access control section, computer logon, remote network access control section 160 can execute the process to authorize the public key certificate by inputting the password of the public key certificate when the authentication drive module is executed and the inputting screen of the public key certificate password is popped by the authentication drive module, after the user authorization execution through the fingerprint identification.

The authentication drive module can execute the authorization using one-time password (OTP), besides the public key certificate. That is, by the user inputting password generated by pressing the fixed button of the biometric card 210, the user authorization can be executed after transmitting the inputted password to the authorization center and receiving the authorization result.

As described, since the biometric card 210 is installed in the computer logon, remote network access control section, computer logon, remote network access control section 160, and the installed biometric card 210 executes the user authorization with the fingerprint pattern recognition information which is pre-stored personal biometric information, even though the other user holds the biometric card 210 abnormally, the other user cannot be able to use the computer logon, remote network access control section, computer logon, remote network access control section 160, so the illegal and abnormal use of the computer logon, remote network access control section, computer logon, remote network access control section 160 can be cut in advance. Also, when the biometric card 210 executes the additional user authorization using public key certificate and one-time password (OTP), besides using the fingerprint pattern recognition information, more intensified user authorization effect can be obtained.

As described, the biometric card 210 can support contact-(standard contact way) and noncontact access way.

Meanwhile, the logistics track server 110 can perform the controlling function using this kind of information besides storing information of container status information and present location information.

For example, it tracks the present location information of the container or truck in real time, and transmits a breakaway alarm message to a driver when the present location information has left a predetermined path. The communication means transmitting the breakaway alarm message can be a mobile phone or a fixed communication terminal device.

When the logistic tracks server 110 tracks the present location information of the container or truck in real time, and when the present location information has left the predetermined path, and then a report message can be transmitted to the predetermined control center such as police or contract security. The transmitted report message includes at least one of present location information, satellite picture, and map.

As explained above, according to the preferred embodiment of the present invention, entrance control and cargo container/trailer management are supported integrated, and it has effect of providing the environment supporting the logistics safety management and logistics track.

As above, even though it is explained that all components comprising the preferred embodiment of the present invention are combined or operated after combined, the present invention is not always limited to such preferred embodiment. That is, at least one of those all components can be combined selectively and can be operated. Also, all components can be implemented respectively as an independent hardware, but also it can be implemented as the computer program having program module which performs some or all functions that are combined in one or a plurality of hardware, as some or all of each components are combined selectively. The codes and code segments comprising the computer program can be easily inferred by the person in charge of technical field of the present invention. Such computer program is stored in the computer readable media, and is read and executed by the computer, and can embody the preferred embodiment of the present invention. A magnetic record media, an optical record media, and a carrier wave media are comprised as the computer program storage media.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

The invention claimed is:

1. A system for tracking containers and logistics utilizing a biometric authorization device and a container security device (CSD), the system comprising:
   a container security device control section for receiving a biometric authentication card information in accordance with an authentication executing result from the biometric authentication card for storing a biometric information, and generating a container status information including a locking information after performing a locking operation of a container and an opening message in case that the container is in status "open";
   a container vehicle location tracking communication terminal section for receiving the container status information from the container security device control section, periodically generating a present location information and wireless transmitting the container status information and the present location information; and
   a container and container tracking server for receiving and storing the container status information and the present location information, and receiving a selected container identification information and extracting and displaying the container status information corresponding to the container identification information and the present location information.

2. The system for tracking containers and logistics according to claim 1, further comprises a container truck driver access control section for receiving a driver biometric card information from a driver biometric authentication card for a biometric information in accordance the authentication executing result, and transmitting a container truck access information including the driver biometric card information to the container vehicle location tracking communication terminal section,
   wherein, the container vehicle location tracking communication terminal section transmits the truck access information to the container and container tracking server, and the container tracking server receives the selected container identification information, and extracting and displaying the container status information corresponding to the container identification information, the present location information, and the truck access information.

3. The system for tracking containers and logistics according to claim 1, further comprises a port gate access control section for receiving the driver biometric card information in accordance with an authentication executing result in the driver biometric card for storing the biometric information and sensing a gate access information including the driver biometric authentication card information and a container information from the container security device, and transmitting the gate access information and the container information to the container and the container tracking server,
   wherein the container tracking server receives the selected container identification information, and extracts and displays the container status information corresponding to the container security device identification information, the present location information, and the gate access information.

4. The system for tracking containers and logistics according to claim 1, further comprises a container materials handling equipment control section for receiving a unloading worker biometric authentication card information in accordance with an authentication executing result from a unloading worker biometric card for storing the biometric information and transmits a container materials handling information including the unloading worker biometric card information to the container tracking server,
   wherein the container tracking server receives the selected container security device identification information, and extracts and displays the container status information corresponding to the container identification information, the present location information, and the container materials handling equipment information.

5. The system for tracking containers and logistics according to claim 1, further comprises a building physical access control section for receiving a biometric card information of a building entrance control and an export and import logistics system in accordance an authentication executing result from the biometric authentication card information of a building entrance control and an export and import logistics system used as an authorization device using the biometric authentication, and transmitting a building physical access control information including the biometric card information of the building entrance control and the export and import logistics system to the container and container tracking server,
   wherein the container tracking server receives the selected container identification information and extracts and displays the container status information corresponding to the container identification information, the present location information, and the facility access control information.

6. The system for tracking containers and logistics according to claim 1, further comprises a computer logon and remote network access control section, transmitting a computer logon and remote network access control information including an information for a computer user authorization device to the container tracking server after receiving the information for the computer user biometric authorization device in accordance with an authentication executing result from a computer user biometric authorization device for storing an authorization information including the biometric authentication card information,
   wherein the container tracking server receives the selected container identification information and extracts and displays the container status information corresponding to the container identification information, the present location information, and the computer access control information.

7. The system for tracking containers and logistics according to claim 6, wherein the computer logon and remote network access control section executes a user authorization process after confirming the computer authorization signal, and drives a virtual private client module in accordance with an execution result of the user authorization process.

8. The system for tracking containers and logistics according to claim 6, wherein the biometric authorization device for the computer user is implemented from at least any one among a biometric authentication card a USB security token, or a dongle.

9. The system for tracking containers and logistics according to claim 1, wherein the container tracking server tracks the present location information in real time, and transmits a breakaway alarm message to a driver communication means when the present location information is leaved a predetermined path.

10. The system for tracking containers and logistics according to claim 1, wherein the container tracking server tracks the present container location information in real time, and transmits a report message including the present location information to a container control center when the present location information is leaved a predetermined path.

11. The system for tracking containers and logistics according to claim 1, wherein the authorization device comprising:
- a biometric information scan and input section for inputting the biometric information by a user;
- a biometric information storage section for storing the biometric information of a registered subscriber;
- a public key certificate storage section;
- a biometric information matching section for comparing the biometric information inputted from the biometric information scan and input section with the biometric information stored in the biometric information storage section to determine whether two biometric information are matched or not, when the public key certificate for storing in the public key certificate storage section is received; and
- a public key certificate storage control section for storing the public key certificate in the public key certificate storage section, when the biometric information inputted from the biometric information scan and input section is matched with the biometric information stored in the biometric information storage section and a matching information with the biometric information of the user is included in the public key certificate.

12. The system for tracking containers and logistics according to claim 11, wherein the biometric information storage section stores the biometric information selected from at least any one among fingerprint pattern recognition information, vascular pattern recognition information, voice pattern recognition information, iris pattern recognition information, and palm pattern recognition information.

13. The system for tracking containers and logistics according to claim 11, further comprises a signal transmitting section for transmitting a tunnel start signal to establish a communication tunnel to a target terminal in response to determining that the biometric information inputted from the biometric information scan and input section is matched to the biometric information stored in the biometric information storage section.

14. The system for tracking containers and logistics according to claim 13, further comprises an authorizing execution section for authorizing the user by transmitting an authorization information based on the public key certificate stored in the public key certificate storage section to the target terminal.

15. The system for tracking containers and logistics according to claim 13, further comprises an one-time password (OTP) generating section for generating an one-time password (OTP) in predetermined manner,
wherein the authorizing execution section transmits the OTP generated by the OTP generating section after combining with the authorization information.

16. The system for tracking containers and logistics according to claim 13, wherein the biometric storing section stores a fingerprint pattern recognition information for the plurality of fingers of the registered subscriber as the biometric information, and the signal transmitting section transmits the tunnel start signal to other target terminals in accordance with the fingerprint pattern recognition information which is matched with the fingerprint pattern recognition information inputted by the user among the stored fingerprint pattern recognition information.

17. The system for tracking containers and logistics according to claim 14, wherein the signal transmitting section transmits a code for proving the user and a transmitting time information of the authorization information after combining with the authorization information to the target terminal.

\* \* \* \* \*